June 28, 1960 H. B. GUNTHER Re. 24,842

STRETCH PRESS JAW

Original Filed Dec. 12, 1950 2 Sheets-Sheet 1

INVENTOR
HARRY B. GUNTHER,

BY Martin E. Hogan Jr.
ATTORNEY

June 28, 1960 H. B. GUNTHER Re. 24,842
STRETCH PRESS JAW
Original Filed Dec. 12, 1950 2 Sheets-Sheet 2
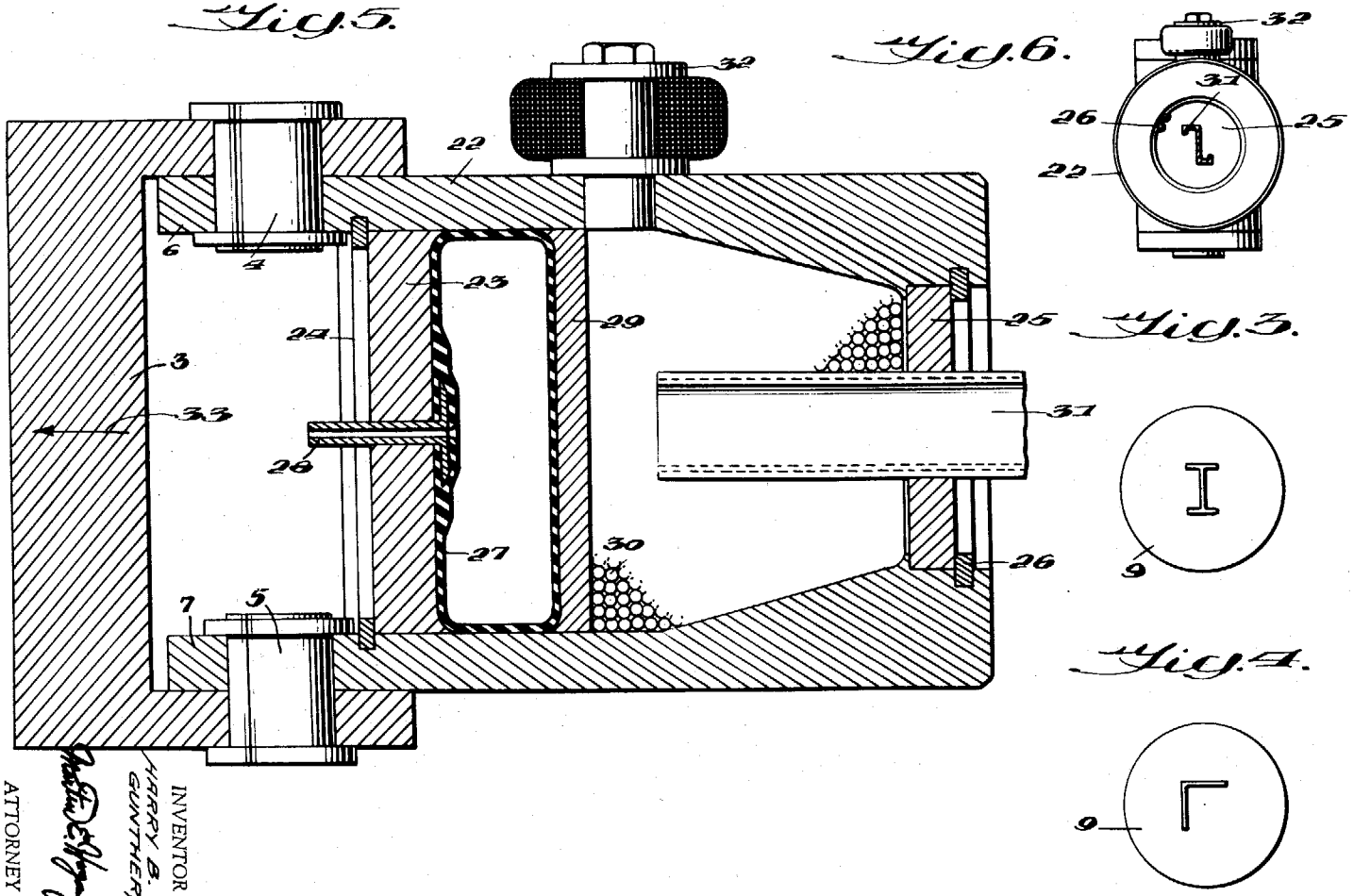
INVENTOR
HARRY B. GUNTHER,
Martin E. Hoyt Jr.
ATTORNEY United States Patent Office Re. 24,842
Reissued June 28, 1960

24,842

STRETCH PRESS JAW

Harry B. Gunther, Baltimore County, Md., assignor to The Martin Company, a corporation of Maryland Original No. 2,715,532, dated Aug. 16, 1955, Ser. No. 200,398, Dec. 12, 1950. Application for reissue Dec. 5, 1956, Ser. No. 626,806

7 Claims. (Cl. 279—4)

Matter enclosed in heavy brackets [ ] appears in the original patent but forms no part of this reissue specification; matter printed in italics indicates the additions made by reissue.

This invention relates to gripping devices and more particularly a stretch press jaw adapted to grip various cross sectional shapes with equal facility.

To a great extent, the utility of a stretch press for aircraft construction purposes is dependent upon the ability of its jaws to handle materials of various cross-sectional shapes. This feature has not been satisfactorily attained in the prior art. Conventional jaws are only adaptable to one particular cross-sectional shape, thus making it necessary to use jaws specially designed for each different shap to be stretch formed.

The relatively high forces required for such a forming operation necessitate the use of jaws which apply a nearly uniform pressure over a given length of material. If this is not done and the gripping force is locally applied, stress concentration will cause the material to rupture in the jaw before the forming operations are completed. Therefore, to obtain proper gripping action, conventional jaws must be precision matched. Such construction is time consuming and expensive, not to mention the fact that the jaw is then only adapted to grip one particular cross-sectional shape.

An object of this invention is to provide an economical and versatile stretch press jaw readily adaptable for gripping a workpiece or part of any cross-sectional shape.

Another object of this invention is to provide a jaw readily adaptable to conventional stretch press equipment.

Another object of this invention is to provide a jaw which will apply a powerful and uniform gripping force.

Still another object of this invention is to provide a fast acting jaw which will allow easy insertion and removal of the part to be gripped.

Further and other objects will become apparent from the accompanying description and drawings which form a part of this disclosure and in which like numerals refer to like parts.

In the drawing:

Figures 3 and 4 are views of jaw face plates.

Figure 5 is a sectional side view of a modification of the jaw shown in Figure 2.

Figure 6 is an end view of the modified jaw shown in Figure 5.

Figure 2:
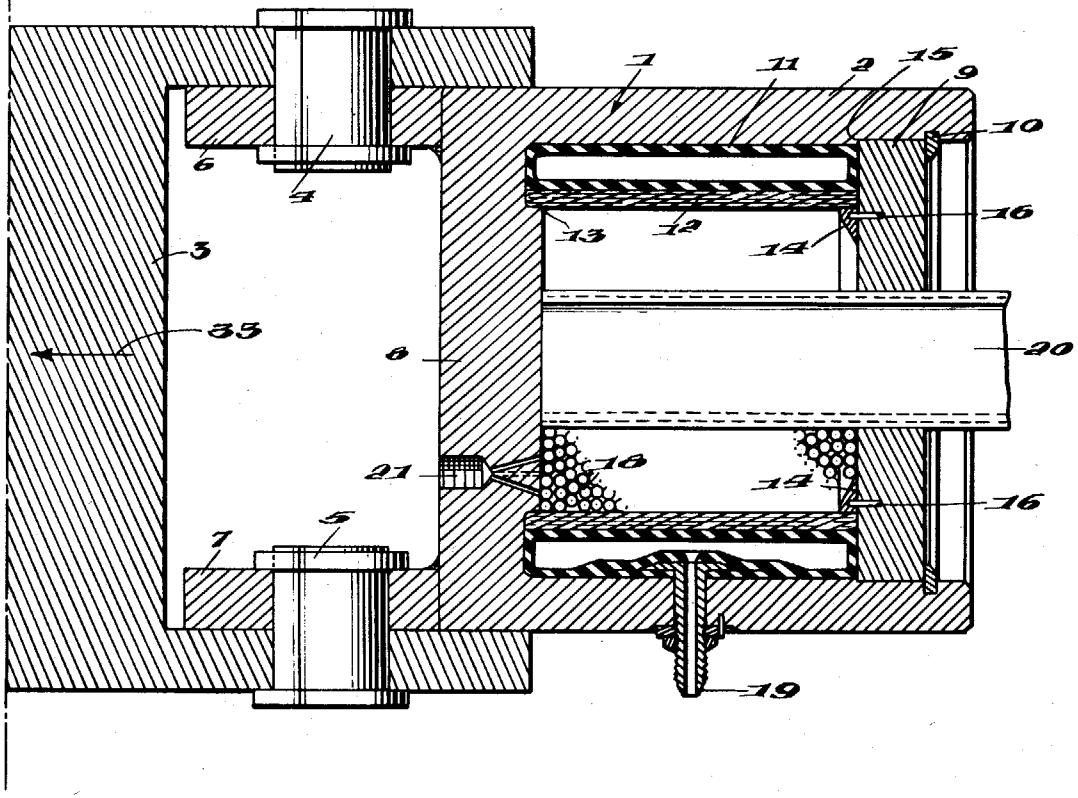
Figure 2 is a sectional side view of the stretch press jaw taken on the line 2—2 of Figure 1.

Stretch press jaw 1 includes a tubular housing 2 supported by stretch press member 3 through pins 4 and 5 engaging housing extensions 6 and 7. Transverse bulkhead 8 is integrally formed at one end of tubular housing 2 adjacent extensions 6 and 7. On the opposite end of tubular housing 2, an adaptor plate 9, seated against a shoulder 15 is removably secured transversely of the housing by retainer ring 10 to form a chamber. Within housing 2 and between bulkhead 8 and adaptor plate 9, a hollow tubular expansible bag 11 engages the inner wall of the housing. A cylindrically shaped flexible belt 12 of wear resistant material circumferentially engages bag 11 to effectively form a part thereof for protecting the less rugged bag against possible damage. Bag 11 and its associated belt 12 are held in position by protrusion 13 formed integral with bulkhead 8 and by ring 14 on adaptor plate 9. Ring 14 is held in position on adaptor plate 9 by dowels 16. The chamber space remaining within housing 12 is substantially filled by a mass of hard steel balls 18. A hollow stem 19 communicating with bag 11 provides a passage for fluid for expanding bag 11 whereby pressure is applied to balls 18. An opening 21 is provided in housing 2 through which air may be forced to enter to agitate the mass of balls and to cause quick and complete deflation of bag 12.

It is quite important that a substantial volume change occur in the space occupied by the balls, as effected by inflating and deflating bag 11, in order to provide both sufficient space, with the part inserted, for agitating the balls and for applying ample pressure to the mass of balls for gripping the part. By virtue of the annular shape of bag 11 such a volume change in the space occupied by the balls is readily obtained with but small elastic deformation of the bag. This of course increases the life of the bag and results in a quicker acting jaw.

Figure 1:
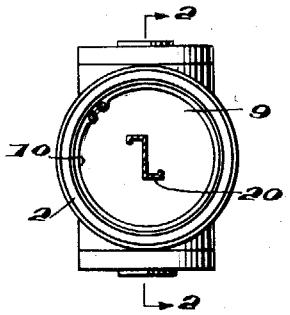
Figure 1 is a front view of the stretch press jaw of this invention.

For any particular cross-sectional shape to be gripped in jaw 1, it is only necessary to employ an adaptor plate 9 having an opening, which, after inserting the part, is small enough to prevent the balls from escaping. Adaptor plate 9 shown as part of jaw 1 has an opening adapted to receive a Z-section as indicated in Figure 1. Figures 3 and 4 illustrate, as examples, adaptor plates for receiving other cross-sectional shapes. The openings in these adaptor plates may be roughly dimensioned and do not require precision tooling. Where the thickness of the part to be gripped is less than the diameter of the balls, the opening in the adaptor plate may be such as to receive any of several cross-sectional shapes.

The operation of the jaw is as follows:

Adaptor plate 9, formed with an opening adapted to receive the part 20 to be formed, is secured in position by retaining ring 10 as shown in Figure 2. Part 20 is then pushed through the opening in plate 9 and well into the mass of balls 18. The most effective grip can be realized by having the part butt against bulkhead 8 as shown in Figure 2. Nearly all of the remaining space within housing 2 is taken up by the mass comprising numerous small steel balls, a certain plurality of which contact the portion of the part extending into the jaw while others contact the wear resistant belt adjacent the expansible bag. Fluid is then forced through inlet 19 to bag 11 which is thereby caused to expand and apply pressure to balls 18. This causes the balls to squeeze tightly against one another and against the part, distributing their force in all directions to insure proper gripping action without deforming the part. After applying the pressure to securely grip the part, the stretch press is ready to wrap it over any desired form. After the forming operation is completed, the fluid pressure is released from bag 11 to permit removal of the part. If the balls do not completely release their grip after pressure is removed, opening 21 in bulkhead 8 provides a means through which compressed air may be blown for agitating balls 18 to cause them to fall free of the part. This air agitating provision may also be employed when inserting the part.

If it is desirable, such as where the stretch forming operation is severe, clamping action of the jaw may be greatly increased by applying sufficient pressure on the balls to brinell the part. By such action, they become seated in the material and provide a better grip to resist the tension load applied to the part. The pressure required for brinelling the part may be maintained throughout the stretch forming operation or it may be reduced to an amount less than would be required were the metal not brinelled. Whether or not the part is brinelled before it is stretch formed will of course depend upon such things as the physical properties of the metal and the tension force to be applied.

Certain variations in the specific design disclosed hereinabove are believed obvious without departing from the principles of the invention. Such a modification of the jaw is shown in Figures 5 and 6 wherein a tubular housing 22 is closed at one end by a removable bulkhead 23 held in position by a retaining ring 24. At the other end of tubular housing 22, adaptor plate 25, similar to the adaptor plate 9, is arranged in a transverse position and secured by a retaining ring 26. A cylindrical piston-shaped expansible bag 27 is located adjacent bulkhead 23 with a pressure inlet 28 extending through bulkhead 23. An intremediate bulkhead 29, interposed between bag 27 and adaptor plate 25, is adapted to move axially within housing 22 in accordance with the pressure differential developed by fluid pressure in bag 27. The space between intermediate bulkhead 29 and adaptor plate 25 within housing 22 is occupied by a plurality of hard steel balls 30, like balls 18 shown in Figure 2.

Part 31 extends through adaptor plate 25 and is surrounded by balls 30 in the same manner as pointed out in the descripton of Figures 1 and 2. By moving intermediate bulkhead 29 axially, the balls may be squeezed tightly against one another and against part 31 to provide the required gripping action. A magnetic agitator 32 secured to housing 22 provides a means for dislodging the balls to aid insertion or removal of part 31.

The jaw of this invention is especially adapted, though not limited, for use where it is desirable to apply a tension force to the workpiece or part wherein the reaction force is applied in the direction of arrow 33, axially of the part. The most obvious advantage being its versatility in gripping various cross-sectional shapes.

It is to be understood that certain changes, alterations, modifications and substitutions can be made without departing from the spirit and scope of the appended claims.

I claim as my invention:

[1. A gripper jaw comprising a housing forming an inclosed chamber, said housing including a wall having an opening therethrough adapted to permit the axial insertion of a part to be gripped within said chamber, a mass of generally spherical, freely movable balls approximately filling said chamber and normally loosely confined therein, said opening communicating directly with a portion of said chamber normally filled with said balls and the size of said balls being so related to the size of said chamber and of said opening that, when a part to be gripped is axially inserted through said opening it will radially displace certain of said balls and become completely imbedded in and surrounded in all radial directions by a plurality of layers of said balls and be directly contacted on all sides thereof by a plurality of the balls forming the innermost of said layers, and means for applying pressure to the outer portion of said mass of balls whereby force will be transmitted in all directions throughout said mass to urge the balls in the interior of said mass together so as to produce a gripping action on a part imbedded therein.]

2. A gripper jaw comprising a housing forming an inclosed chamber, said housing including a wall having an opening therethrough adapted to permit the axial insertion of a part to be gripped within said chamber, a mass of generally spherical, freely movable balls approximately filling said chamber and normally loosely confined therein, said opening communicating directly with a portion of said chamber normally filled with said balls and the size of said balls being so related to the size of said chamber and of said opening that, when a part to be gripped is axially inserted through said opening it will radially displace certain of said balls and become completely imbedded in and surrounded in all radial directions by a plurality of layers of said balls and be directly contacted on all sides thereof by a plurality of the balls forming the innermost of said layers, means for agitating said balls to facilitate insertion of a part through said opening and into the interior of said mass, and means for applying pressure to the outer portion of said mass of balls whereby force will be transmitted in all directions throughout said mass to urge the balls in the interior of said mass together so as to produce a gripping action on a part imbedded therein.

[3. A gripper jaw comprising a housing forming an inclosed generally cylindrical chamber, said housing including a readily removable end wall having an opening therethrough adapted to permit the axial insertion of a part to be gripped within said chamber, a mass of generally spherical, freely movable balls approximately filling said chamber and normally loosely confined therein, said opening communicating directly with a portion of said chamber normally filled with said balls and the size of said balls being so related to the size of said chamber and of said opening that, when a part to be gripped is axially inserted through said opening it will radially displace certain of said balls and become completely imbedded in and surrounded in all radial directions by a plurality of layers of said balls and be directly contacted on all sides thereof by a plurality of the balls forming the innermost of said layers, and expansible means for applying pressure to the outer portion of said mass of balls whereby force will be transmitted in all directions throughout said mass to urge the balls in the interior of said mass together so as to produce a gripping action on a part imbedded therein.]

4. A gripper jaw comprising a housing forming an inclosed chamber, said housing including a wall having an opening therethrough adapted to permit the axial insertion of a part to be gripped within said chamber, a mass of generally spherical, freely movable balls approximately filling said chamber and normally loosely confined therein, said opening communicating directly with a portion of said chamber normally filled with said balls and the size of said balls being so related to the size of said chamber and of said opening that, when a part to be gripped is axially inserted through said opening it will radially displace certain of said balls and become completely imbedded in and surrounded in all radial directions by a plurality of layers of said balls and be directly contacted on all sides thereof by a plurality of the balls forming the innermost of said layers, means for applying pressure to the outer portion of said mass of balls whereby force will be transmitted in all directions through out said mass to urge the balls in the interior of said mas together so as to produce a gripping action on a part imbedded therein, and means independent of said pressure applying means for agitating said balls to facilitate insertion of a part through said opening and into the interior of said mass.

*5. A gripper jaw comprising a housing forming an inclosed chamber, said housing including a wall having an opening therethrough adapted to permit the insertion of a part to be gripped within said chamber, a mass of hard, freely movable particulate bodies filling said chamber and normally loosely confined therein, said opening communicating directly with a portion of said chamber normally filled with said particulate bodies and the size of said particulate bodies being so related to the size of said chamber and of said opening that, when a part to be gripped is inserted through said opening it will displace certain of said particulate bodies and become completely imbedded in and surrounded by a plurality of layers of said particulate bodies and be directly contacted on all sides thereof by a plurality of the particulate bodies forming the innermost of said layers, an expansible member in said chamber, positioned at least partially around said mass of particulate bodies for ap-*

*plying pressure to the outer portion of said mass of particulate bodies, and means for enabling an expansion force to be applied to said expansible member, whereby upon expansion of said expansible member, force will be transmitted throughout said mass to urge the particulate bodies in the interior of said mass together so as to produce a gripping action on a part imbedded therein.*

*6. A gripper jaw as defined in claim 5 wherein said expansible member is a toroidally shaped inflatable bag.*

*7. A gripper jaw as defined in claim 6 in which the chamber is of generally cylindrical shape and the expansible member extends peripherally of the side wall of the chamber to exert a generally radial force against the particulate bodies upon expansion.*

*8. A gripper jaw comprising a housing forming an inclosed, generally cylindrical chamber, said housing including a wall having an opening therethrough adapted to permit the insertion of a part to be gripped within said chamber, a mass of hard, freely movable particulate bodies filling said chamber and normally loosely confined therein, said opening communicating directly with a portion of said chamber normally filled with said particulate bodies and the size of said particulate bodies being so related to the size of said chamber and of said opening that, when a part to be gripped is inserted through said opening, it will displace certain of said particulate bodies and become completely imbedded in and surrounded by a plurality of layers of said particulate bodies and be directly contacted on all sides thereof by a plurality of the particulate bodies forming the innermost of said layers, an extensible member extending*

*peripherally of the side wall of said chamber and at least partially surrounding said mass of particulate bodies for applying pressure to the outer portion of said mass of particulate bodies, and means for enabling an expansion force to be applied to said extensible member, whereby upon extension of said extensible member, force will be transmitted throughout said mass to urge the particulate bodies in the interior of said mass together so as to produce a gripping action on a part imbedded therein.*

*9. A gripper jaw as defined in claim 8 in which said extensible member extends substantially completely about the periphery of the side wall of said chamber, said member being in the form of an inflatable body.*

References Cited in the file of this patent or the original patent

UNITED STATES PATENTS

| | | |
|---|---|---|
| 162,889 | Blaisse | May 4, 1875 |
| 180,961 | Thackara et al. | Aug. 8, 1876 |
| 1,548,730 | Mirfield | Aug. 4, 1925 |
| 1,754,132 | Van Bekkum | Apr. 8, 1930 |
| 1,984,389 | Wineman | Dec. 18, 1934 |
| 2,108,416 | Smith | Feb. 15, 1938 |
| 2,115,023 | Kennedy | Apr. 26, 1938 |
| 2,170,258 | Borch | Aug. 22, 1939 |
| 2,267,815 | Bush | Dec. 30, 1941 |
| 2,366,908 | Jenkins | Jan. 9, 1945 |
| 2,405,772 | Adams et al. | Aug. 13, 1946 |
| 2,509,673 | Church | May 30, 1950 |
| 2,596,772 | Hawkes | May 13, 1952 |